(12) United States Patent
Battaglia

(10) Patent No.: US 6,881,923 B2
(45) Date of Patent: Apr. 19, 2005

(54) PROCESS FOR LASER MACHINING CONTINUOUS METAL STRIP

(76) Inventor: Vincent P. Battaglia, 209 Banks Rd., Easton, CT (US) 06612

( * ) Notice: Subject to any disclaimer, the term of this patent is extended or adjusted under 35 U.S.C. 154(b) by 104 days.

(21) Appl. No.: 10/318,310

(22) Filed: Dec. 12, 2002

(65) Prior Publication Data

US 2003/0116543 A1 Jun. 26, 2003

Related U.S. Application Data

(60) Division of application No. 09/695,468, filed on Oct. 24, 2000, now Pat. No. 6,515,256, which is a continuation-in-part of application No. 09/548,561, filed on Apr. 13, 2000, now Pat. No. 6,515,253.

(51) Int. Cl.[7] ............................................. B23K 26/38
(52) U.S. Cl. ........................... 219/121.67; 219/121.72
(58) Field of Search ....................... 219/121.67, 121.68, 219/121.69, 121.7, 121.71, 121.72, 121.82; 198/346.2, 346.1

(56) References Cited

U.S. PATENT DOCUMENTS

| | | | |
|---|---|---|---|
| 1,151,983 A | | 8/1915 | Winfield |
| 3,226,527 A | | 12/1965 | Harding |
| 3,256,524 A | | 6/1966 | Stauffer |
| 3,422,246 A | * | 1/1969 | Wetzel .................. 219/121.67 |
| 3,932,967 A | | 1/1976 | Hanes |
| 4,115,683 A | | 9/1978 | Clark et al. |
| 4,180,906 A | | 1/1980 | May |
| 4,182,084 A | | 1/1980 | Friedenberg |
| 4,285,754 A | | 8/1981 | DiMatteo |
| 4,301,593 A | | 11/1981 | May |
| 4,328,411 A | | 5/1982 | Haller et al. |
| D279,509 S | | 7/1985 | Abe et al. |
| D279,825 S | | 7/1985 | Takizawa |
| D284,224 S | | 6/1986 | Izumi |
| 4,676,586 A | * | 6/1987 | Jones et al. .................. 385/33 |
| 4,707,073 A | | 11/1987 | Kocher |
| 4,782,208 A | | 11/1988 | Withrow et al. |
| 5,058,413 A | | 10/1991 | Muddiman |
| 5,089,062 A | | 2/1992 | Pavlik et al. |
| D356,184 S | | 3/1995 | Izumi |
| 5,395,028 A | | 3/1995 | Ishii et al. |
| 5,511,920 A | | 4/1996 | Artrip |
| 5,728,284 A | | 3/1998 | Oyama |
| 5,750,956 A | | 5/1998 | Barnes et al. |
| 5,908,664 A | | 6/1999 | Nagayama |
| 5,919,122 A | | 7/1999 | Geiger et al. |
| 6,031,199 A | * | 2/2000 | Ream et al. ............ 219/121.63 |
| 6,065,323 A | | 5/2000 | Arduino et al. |
| 6,080,958 A | | 7/2000 | Miller et al. |
| 6,183,064 B1 | | 2/2001 | Murthy et al. |
| 6,193,049 B1 | * | 2/2001 | Noda ....................... 198/346.2 |

FOREIGN PATENT DOCUMENTS

| | | |
|---|---|---|
| DE | 41 28 194 A1 | 3/1993 |
| DE | 4442137 | 2/1995 |
| EP | 0 658 383 | 6/1995 |
| JP | 58-029598 | 2/1983 |
| JP | 06-142995 | 5/1994 |

* cited by examiner

Primary Examiner—Kiley Stoner
Assistant Examiner—Jonathan Johnson
(74) Attorney, Agent, or Firm—DeLio & Peterson, LLC; Peter W. Peterson

(57) ABSTRACT

A method for laser machining parts from a strip comprises providing a strip of material from which parts are to be made, feeding the strip into a laser station having first and second lasers, and positioning the first laser with respect to the strip. With the first laser, the method then includes laser machining substantially all of an outline of a plurality of parts in sequence along the strip, leaving at least one tab portion connecting each part to the strip. The second laser is then positioned with respect to the strip and, with the second laser, the method then includes laser machining tab portions connecting parts to the strip in sequence along the strip, and separating the laser machined parts from remaining portions of the strip. Preferably, the first laser and the second laser move simultaneously in the same direction with respect to the strip during laser machining.

8 Claims, 16 Drawing Sheets

PROCESS FOR LASER MACHINING CONTINUOUS METAL STRIP

This is a divisional of U.S. application Ser. No. 09/695,468, filed on Oct. 24, 2000 now U.S. Pat. No. 6,515,256, which is a continuation-in-part of U.S. Ser. No. 09/548,561, filed on Apr. 13, 2000 now U.S. Pat. No. 6,515,253.

BACKGROUND OF THE INVENTION

1. Field of the Invention

The present invention relates to a method and apparatus for laser machining metal parts from a continuous strip.

2. Description of Related Art

Rotary shaver heads employ shaver cups which contact the user's skin and include slots which permit the hairs on the skin to pass through to be clipped by the cutters mounted within the cup. The mechanical forming and machining of rotary shaver heads is a labor intensive and costly process since the cups are first drawn by conventional mechanical forming process into individual parts. The individual parts are then mounted in further machinery wherein the top portion of the cup which contacts the user's skin is lapped, machined or other wise reduced in thickness to provide a relatively thin section. Finally, the cup is then mounted in another machine where cutting or grinding blades cut the finely spaced, individual slots in the top cup portion. This multiple processing of small parts cannot easily be automated and is costly to perform.

While laser machining to form holes has been known, laser machining processes have generally been done on finished parts (see for example U.S. Pat. No. 5,058,413), with attendant handling difficulties. While laser drilling of holes has been performed in steel sheets (e.g., U.S. Pat. No. 5,089,062), this has not generally been known in conjunction with mechanical formation of the sheet material.

Bearing in mind the problems and deficiencies of the prior art, it is therefore an object of the present invention to provide an improved process and apparatus to produce rotary shaver heads and other metal parts.

It is another object of the present invention to provide a process and apparatus which eliminates individual handling of rotary shaver and other metal parts during process, where the process requires making fine holes in the parts.

A further object of the invention is to provide an improved machining process and apparatus which provides flexibility in laser machining individual parts.

Still other objects and advantages of the invention will in part be obvious and will in part be apparent from the specification.

SUMMARY OF THE INVENTION

The above and other objects, which will be apparent to those skilled in the art, are provided in the present invention which relates in a first aspect to a method for making parts from deformable strip comprising providing a continuous strip of deformable material, preferably plastically deformable, from which parts are to be made; mechanically forming a plurality of parts in sequence along the strip; laser machining a plurality of parts in sequence along the strip; and separating the mechanically formed, laser machined parts from remaining portions of the strip. The laser machining may precede or follow the mechanically forming of the parts.

In another aspect, the present invention provides a method for making parts from strip metal comprising providing a strip of metal from which parts are to be made; partially mechanically forming a plurality of parts in a portion of the metal strip; laser machining the partially mechanically formed parts while in the metal strip; further mechanically forming the laser machined, partially mechanically formed parts while in the metal strip; and separating the further mechanically formed, laser machined parts from remaining portions of the metal strip. Preferably, the partial and further mechanically forming steps and the laser machining step include feeding the metal strip into a press to partially mechanically form the parts. The partial and further mechanically forming steps may comprise drawing the parts, and the laser machining step may comprise laser etching or laser machining holes in the parts. The method steps are preferably continuously and sequentially performed. The metal strip may be accumulated in an accumulator to control process speed differences between the partially mechanically forming step and the laser machining step or between the laser machining step and the further mechanically forming step.

In another related aspect, the present invention provides a method for making parts from strip metal comprising providing a strip of metal from which parts are to be made; providing a first press to partially mechanically form parts in the metal strip; providing a laser machining station to laser machine parts in the metal strip; and providing a second press to further mechanically form parts in the metal strip. The method is then performed by feeding the metal strip into the first press and partially mechanically forming a plurality of parts in a portion of the metal strip; thereafter feeding the metal strip into the laser machining station and laser machining the partially mechanically formed parts while in the metal strip; feeding the metal strip into the second press and further mechanically forming the laser machined, partially mechanically formed parts while in the metal strip; and separating the further mechanically formed, laser machined parts from remaining portions of the metal strip. The metal strip may be provided in coiled form, and the steps following feeding the metal strip into the first press are performed without recoiling the metal strip. The method may further include providing an accumulator between the first press and the laser machining station and accumulating metal strip in the accumulator to control process speed differences between the first press and the laser machining station. The partial mechanical forming step may comprise partially drawing the parts and the further mechanical forming step may comprise finish drawing the parts. The laser machining step may comprise laser etching the parts or laser machining holes in the parts.

In a particularly preferred embodiment, in the first press there are partially drawn a plurality of shaver cups in a portion of the metal strip, in the laser machining station there are laser machined slots in the shaver cups in the metal strip, more preferably curved slots, and in the second press there are finish drawn a plurality of the shaver cups in the metal strip.

In yet another aspect, the present invention relates to an apparatus for making parts from strip metal comprising an uncoiler adapted to uncoil a strip of metal from which parts are to be made; a first press adapted to partially mechanically form a plurality of parts in a portion of the metal strip; a laser machining station adapted to laser machine the partially mechanically formed parts while in the metal strip; and a second press adapted to further mechanically form the laser machined, partially mechanically formed parts while in the metal strip. Preferably, the second press is further adapted to separate the further mechanically formed, laser machined parts from remaining portions of the metal strip. The apparatus preferably includes a metal strip accumulator between the first press and the laser machining station adapted to control process speed differences between the first press and the laser machining station.

In a further aspect, the present invention provides a method for laser machining parts from a strip comprising providing a strip of material from which parts are to be made, feeding the strip into a laser station having a laser, and positioning the laser into a first position with respect to the strip. In the first laser position, the method then includes laser machining substantially all of an outline of a plurality of parts in sequence along the strip, leaving at least one tab portion connecting each part to the strip. The laser is then positioned into a second position, different from the first position, with respect to the strip. In the second laser position, the method then includes laser machining the tab portions connecting the parts to the strip in sequence along the strip, and separating the laser machined parts from remaining portions of the strip.

Another aspect of the present invention provides a method for laser machining parts from a strip comprising providing a strip of material from which parts are to be made, feeding the strip into a laser station having first and second lasers, and positioning the first laser with respect to the strip. With the first laser, the method then includes laser machining substantially all of an outline of a plurality of parts in sequence along the strip, leaving at least one tab portion connecting each part to the strip. The second laser is then positioned with respect to the strip and, with the second laser, the method then includes laser machining tab portions connecting parts to the strip in sequence along the strip, and separating the laser machined parts from remaining portions of the strip. Preferably, the first laser and the second laser move simultaneously in the same direction with respect to the strip during laser machining.

Yet another aspect of the present invention provides a method for laser machining parts from a strip comprising providing a strip of material from which parts are to be made, feeding the strip into a first laser station and, in the first laser station, laser machining substantially all of an outline of a plurality of parts in sequence along the strip, leaving at least one tab portion connecting each part to the strip. The method then includes feeding the strip into a second laser station, and, in the second laser station, laser machining the tab portions connecting the parts to the strip in sequence along the strip, and thereafter separating the laser machined parts from remaining portions of the strip.

The present invention also provides a method for making parts from strip metal comprising providing a strip of metal from which parts are to be made, mechanically forming pilot holes in the metal strip, and feeding the strip into one or more laser stations. In the one or more laser stations, the method then includes laser machining a plurality of parts in sequence along the strip, leaving at least one tab portion connecting each part to the strip and separating the laser machined parts from remaining portions of the strip.

In all of the aforestated methods, the strip preferably comprises a continuous strip initially in coil form. A servo-controlled feeder may be connected to the laser station to receive and feed the strip in a desired position relative to the laser. Such servo-controlled feeder may include a pilot pin that is adapted to engage a hole in the strip to position the strip in a desired position during laser machining, and to disengage from the strip hole during strip feeding.

In related aspects, the present invention further provides an apparatus for making parts from strip metal comprising an uncoiler adapted to uncoil a strip of metal from which parts are to be made, and a first press adapted to form sequential pilot holes in a portion of the metal strip. The apparatus further includes a first laser adapted to laser machine substantially all of an outline of a plurality of parts in sequence along the strip, leaving at least one tab portion connecting each part to the strip and a second laser, following the first laser, adapted to laser machine the tab portions connecting the parts to the strip in sequence along the strip, thereby causing the laser machined parts to separate from remaining portions of the strip.

Preferably, there are provided metal strip accumulators between the first press and the first and second lasers adapted to control process speed differences between the first press and the first and second laser machining stations. Also, the first laser and the second laser are preferably adapted to move simultaneously in the same direction with respect to the strip during laser machining. The first laser and the second laser may be disposed in separate laser stations, or they may both be disposed in a single laser station. A fiber optic cable may transmit laser light from a laser power supply to the one or more lasers or laser heads.

A further aspect of the present invention provides an apparatus for making parts from strip metal comprising a laser machining station having at least one laser head to laser machine a plurality of parts in sequence along a strip and a servo-controlled feeder connected to the laser machining station to receive and feed the strip in a desired position relative to the at least one laser head. In a preferred embodiment, the servo-controlled feeder includes a pilot pin that is adapted to engage a hole in the strip to position the strip in a desired position during laser machining, and to disengage from the strip hole during strip feeding.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3b is a side elevational view of the part shown in FIG. 3a.

FIG. 4b is a side elevational view of the part shown along line 4b—4b in FIG. 4a.

FIG. 5b is a side elevational view of the part shown along line 5b—5b in FIG. 5a.

FIG. 6b is a side elevational view of the part shown along line 6b—6b in FIG. 6a.

FIG. 7b is a side elevational view of the part shown along line 7b—7b in FIG. 7a.

FIG. 8b is a side elevational view of the part shown along line 8b—8b in FIG. 8a.

DESCRIPTION OF THE PREFERRED EMBODIMENTS

Figure 1:
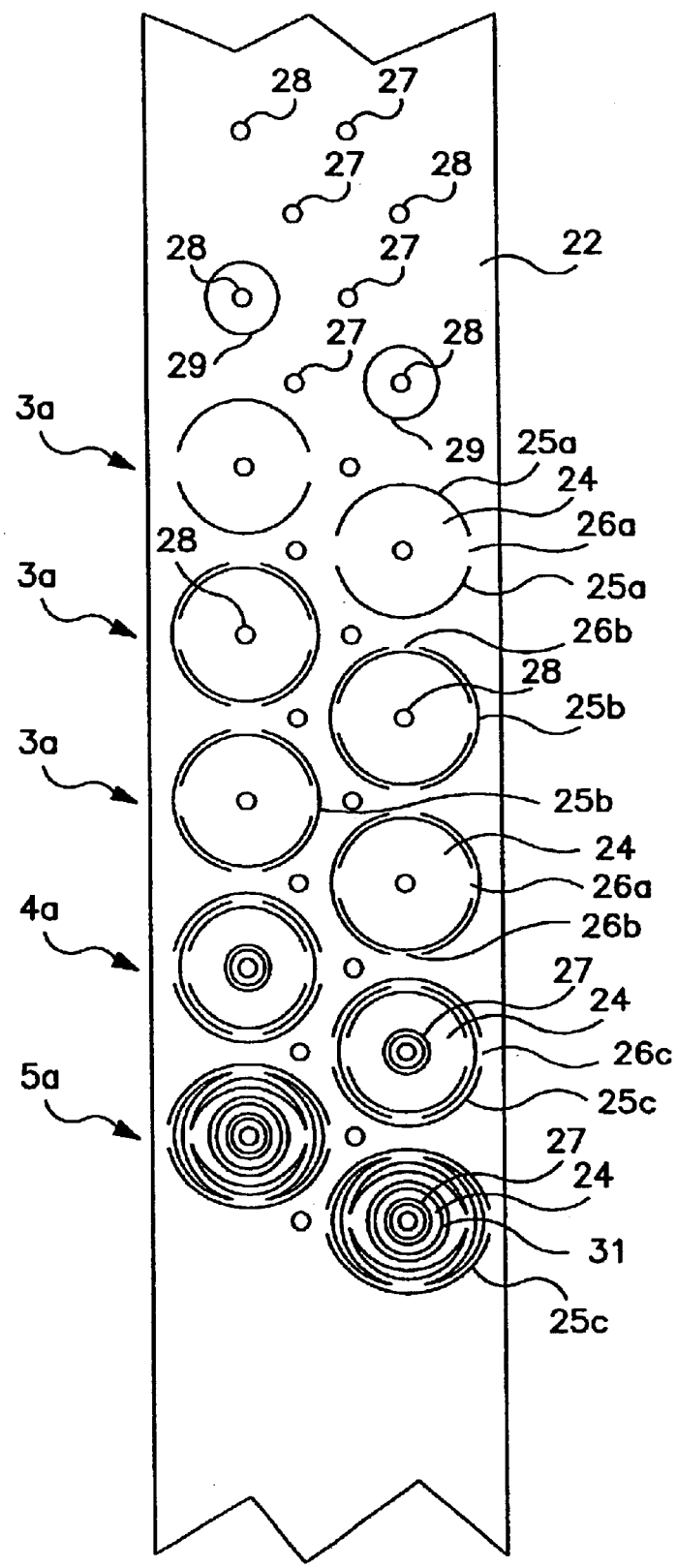
FIG. 1 is a top plan view of a continuous strip of metal or other formable material showing the progressive sequence of part formation in the strip prior to laser machining.

In describing the preferred embodiment of the present invention, reference will be made herein to FIGS. 1–16 of the drawings in which like numerals refer to like features of the invention. Features of the invention are not necessarily shown to scale in the drawings.

In general, the present invention is directed to a process and apparatus for laser machining formed strip metal into parts which are processed in continuous strip form, and then are separated into individual parts only at the end of mechanical and laser forming and machining. In particular, the process of the present invention has been found to be especially useful for producing rotary shaver cups or like items. The present invention creates a more robust rotary shaver by enhancing the closeness of the cut and the opportunity of the rotary shaver blades to cut. The closeness of cut is controlled by the thickness of the top portion of the shaver cup, i.e., the distance from the skin surface to the apex of the cutting element in its centrifugal runout. The opportunity to cut is the active perimeter that is available for cutting along the outer circumference of the shaver cup. The more openings there are in the cup, the faster the cup can collect hairs for cutting by the cutters. If the rotary cutter and shaver cup are not in proper engagement, the whisker hair can push the cutter down or away from the cut. Moreover, the rotary shaver cup of the present invention better directs hairs to uncurl and straighten out as they are being cut.

As broadly defined, the process generally comprises feeding a strip of metal into an otherwise conventional press and partially, mechanically forming a part in the strip, without removing the part from the strip. The partially formed part, as still attached to the strip, is then fed continuously into a laser machining station where a laser then performs the desired machining to the part while attached to the strip. Alternatively, the process as broadly defined utilizes successive laser stations to machine a desired part from the strip, preferably after forming pilot holes in the strip, more preferably after mechanically forming those holes. As used herein, the term laser machining refers to a hole cutting, etching (e.g., partial cutting through a thickness) or other conventional laser machining processes. The laser machining may also precede the mechanical forming. Preferably, the partially formed, laser machined part, again as it is still attached to the strip, is then fed into another press and the mechanical part formation is finished and/or the part is cut out and separated from the strip.

Figure 2:
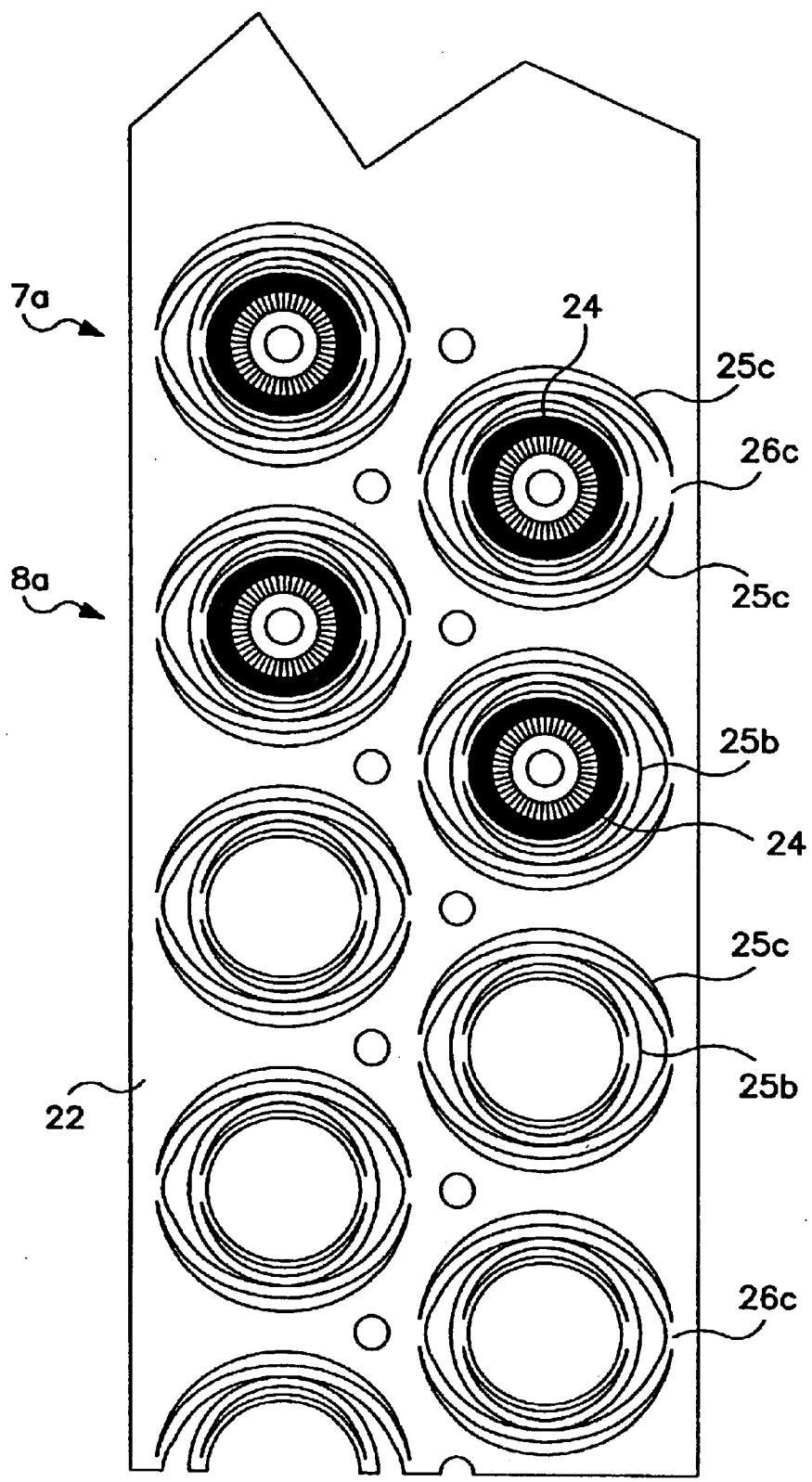
FIG. 2 is a top plan view of the continuous strip of metal or other formable material of FIG. 1 showing the progressive sequence of part formation in the strip subsequent to laser machining.
Figure 7A:
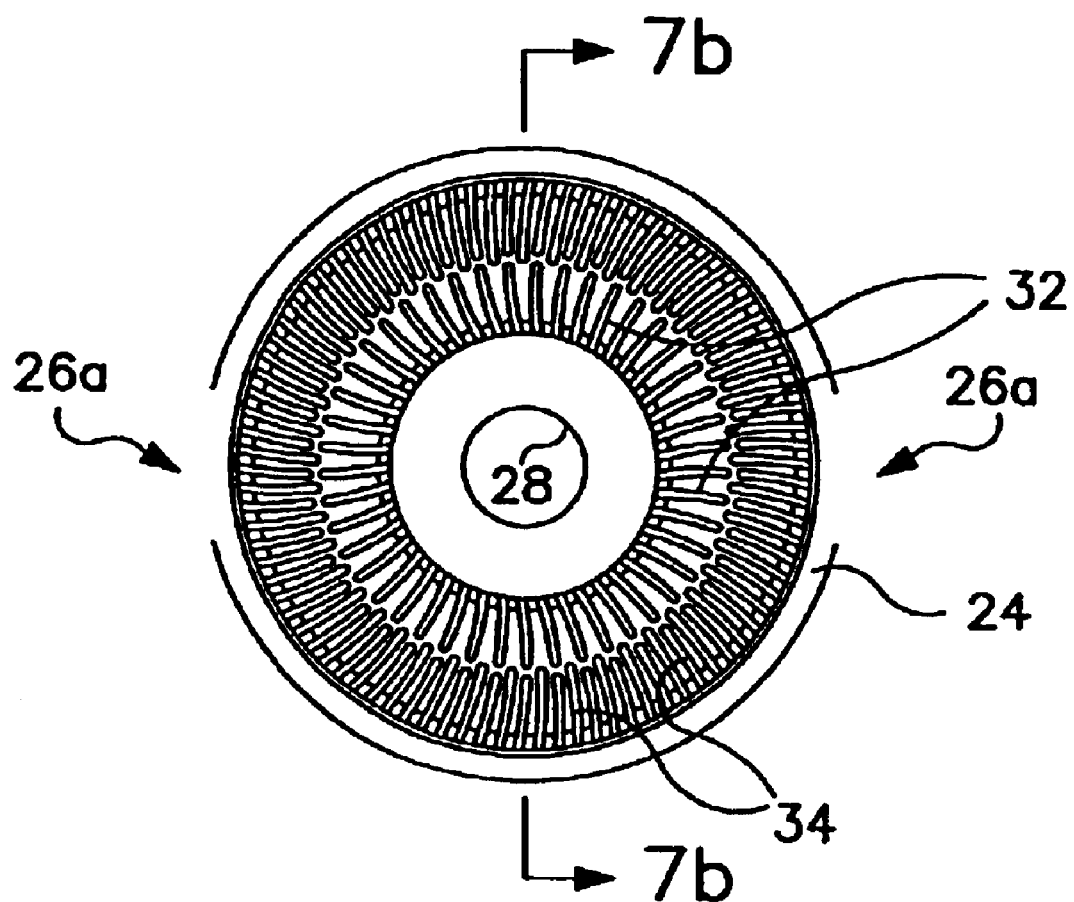
FIG. 7a is a top plan view of a fifth stage of a part formed in a strip in accordance with one embodiment of the present invention.
Figure 7B:
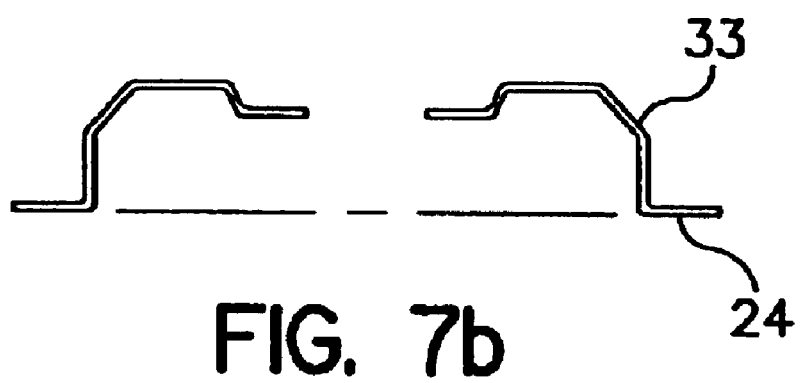
Figure 8A:
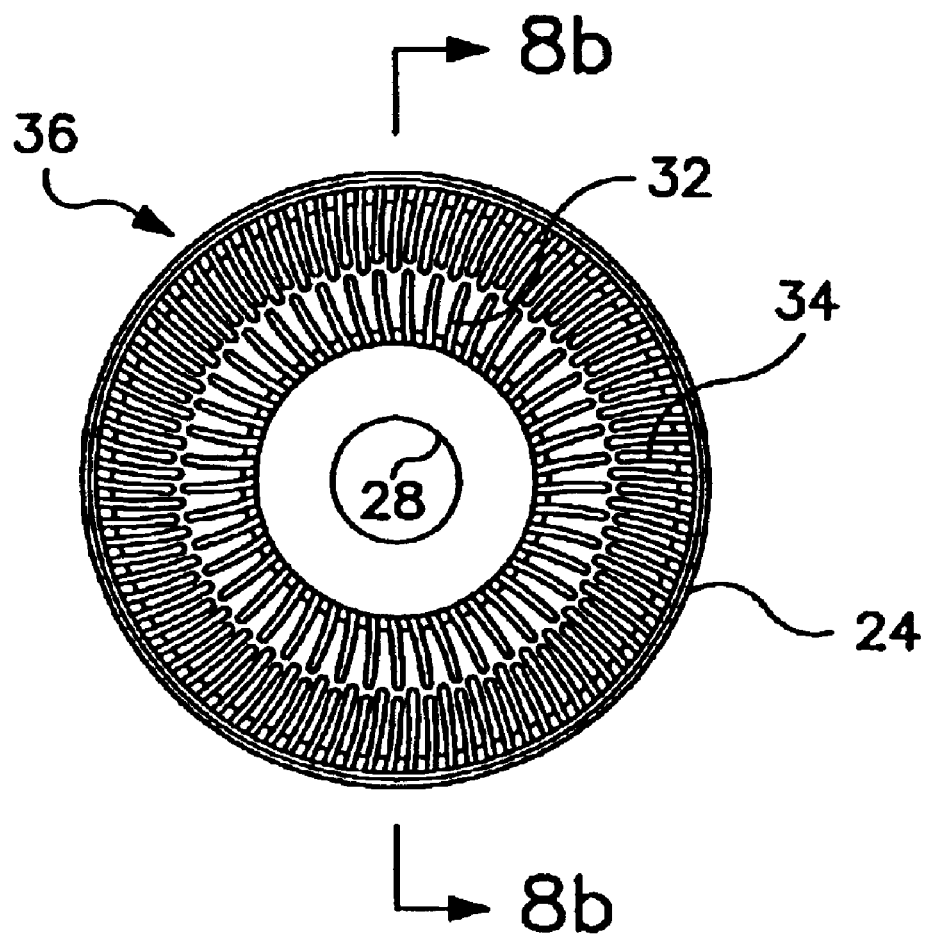
FIG. 8a is a top plan view of a sixth stage of a part formed from a strip in accordance with one embodiment of the present invention.
Figure 8B:
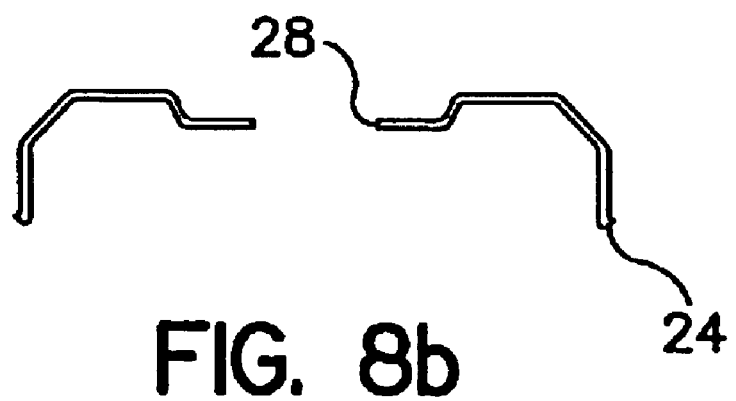
Figure 9:
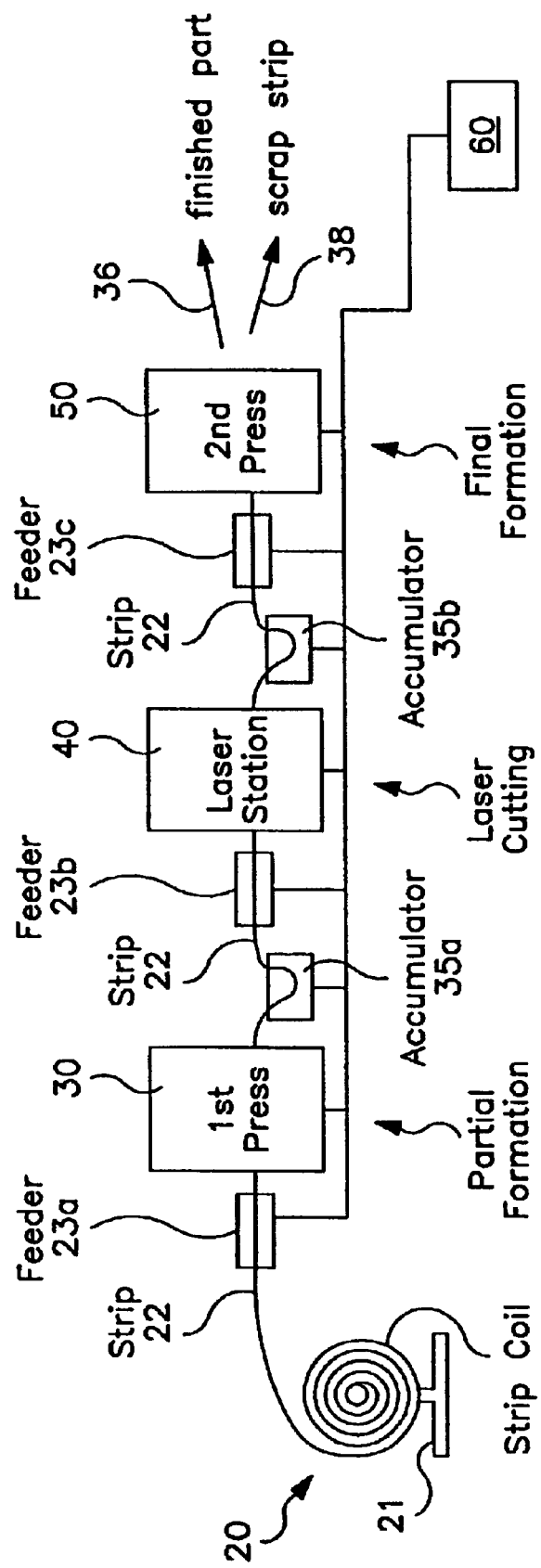
FIG. 9 is a side view, partially in schematic, of a first preferred process in accordance with the embodiment of the present invention depicted in FIGS. 1–8b.

The process of the present invention used to form the preferred rotary shaver head is depicted in FIGS. 1–8b. Overall views of the strip before and after laser machining are shown in FIGS. 1 and 2, respectively, while individual part formation views are shown in FIGS. 2a–8b. The sequential locations of part formation views 2a–8a on the strip are indicated on FIGS. 1 and 2. An overall process apparatus schematic for this embodiment as well as other embodiments is depicted in FIG. 9. Initially, a strip 22 of sheet metal or other formable material is obtained in coil form 20 for feeding into a first press 30 wherein the part is to be partially mechanically formed while still attached to strip 22. The strip used to form the rotary shaver cup in particular is preferably annealed medium carbon steel, although the process of the present invention may be used in general with low, medium or high carbon steel, or other metals and alloys in strip form. In the process, the coil of strip steel from which the part is to be made is first loaded into a payoff reel 21 and made ready to enter the feed in the first press. The feeder 23a, which precedes the first die, precisely sets the lead or progression of the strip as it travels through the die. After entering the first progressive die, registration or pilot holes 27, for advancing the strip through the die, and part central holes 28 creating the inner diameter shape are pierced in strip 22 in the first station. In a manner well known in the prior art, two parts are formed along the width of strip 22, with one part advanced with respect to the other by one-half the part pitch, for efficient utilization of the strip. While part formation views 3a–8a are indicated with respect to the parts on the left hand portion of the strips shown in FIGS. 1 and 2, it is to be understood that the same operations are made to the parts on the right hand portion of the strip.

In the second die station the portion 29 of the strip around central hole 28 is thinned from its original strip thickness by cold reducing or hammering. This thickness reduction in area 29 is desirable for the central portion of the finished part which eventually forms the slotted comb portion of the shaver head, and will be omitted from subsequent views for clarity of other operations.

Figure 3A:
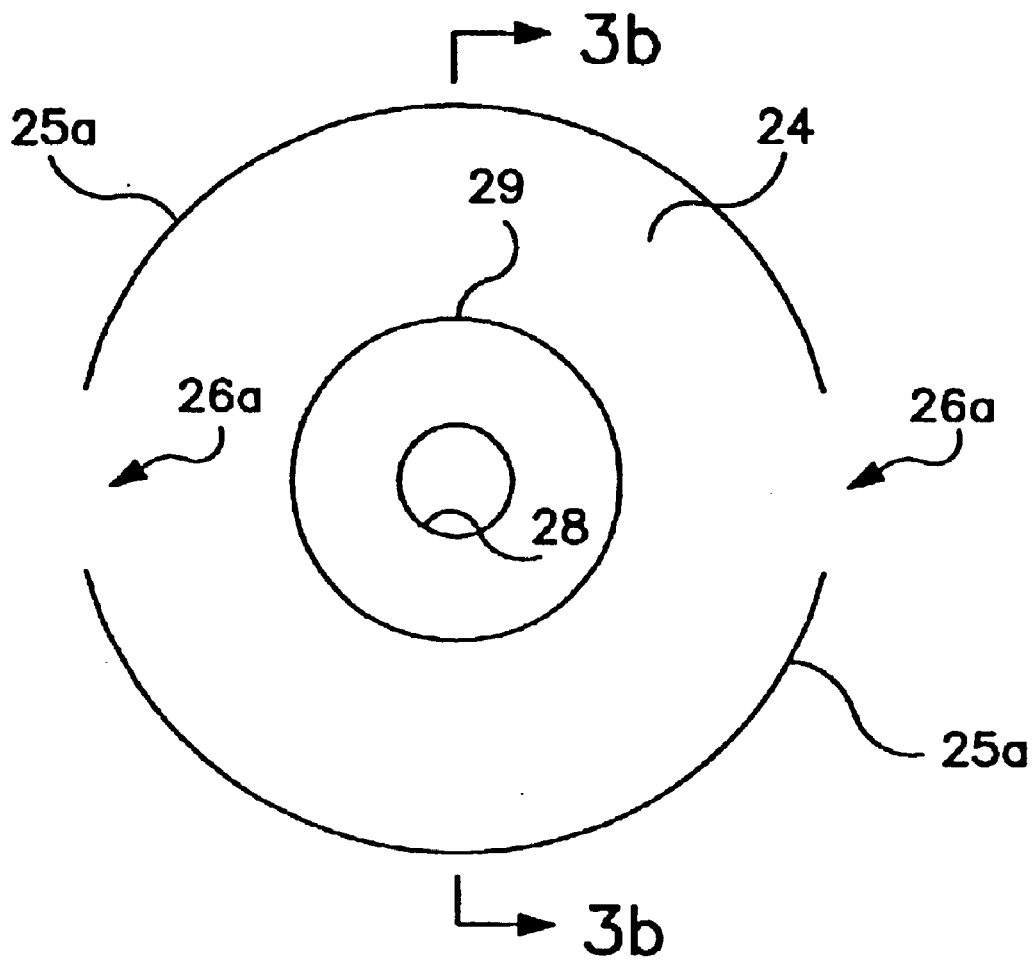
FIG. 3a is a top plan view of a first stage of a part formed in a strip in accordance with one embodiment of the present invention.
Figure 3B:
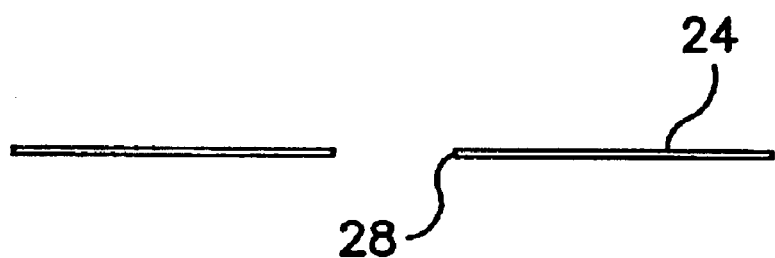
Figure 4A:
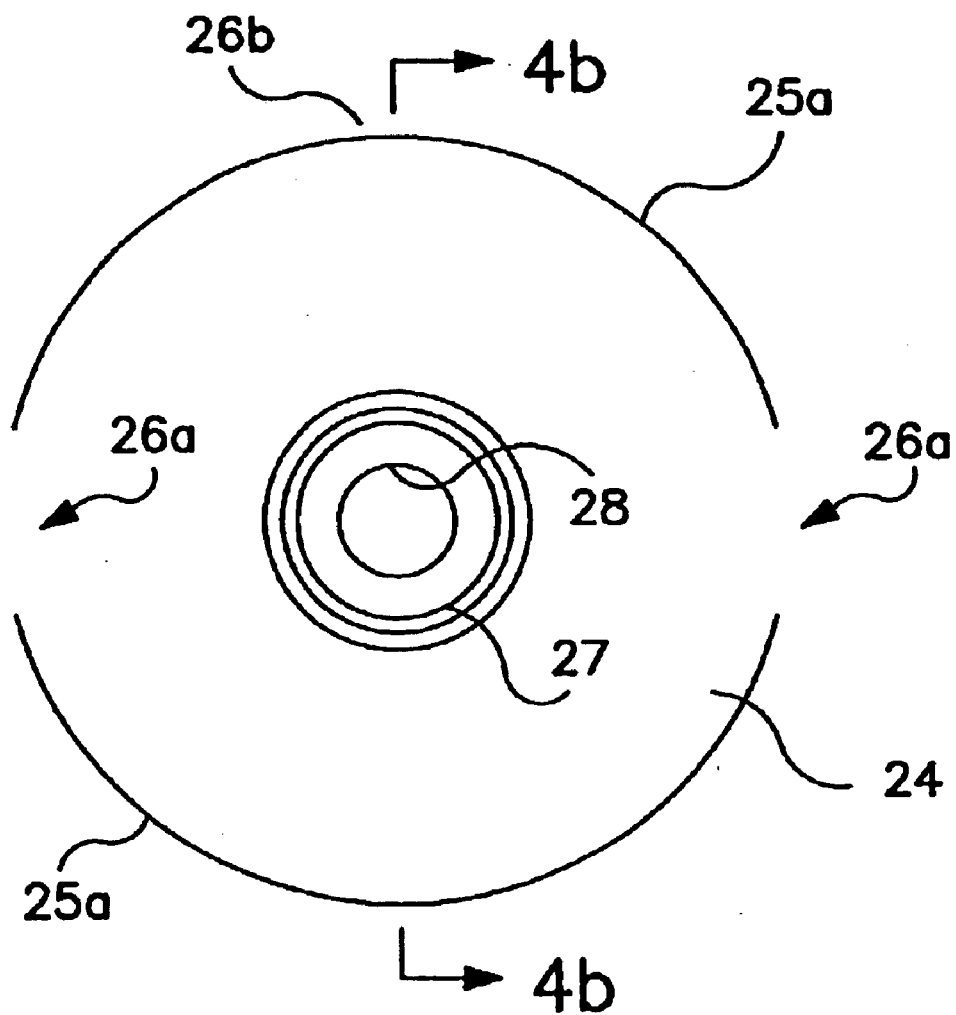
FIG. 4a is a top plan view of a second stage of a part formed in a strip in accordance with one embodiment of the present invention.
Figure 4B:
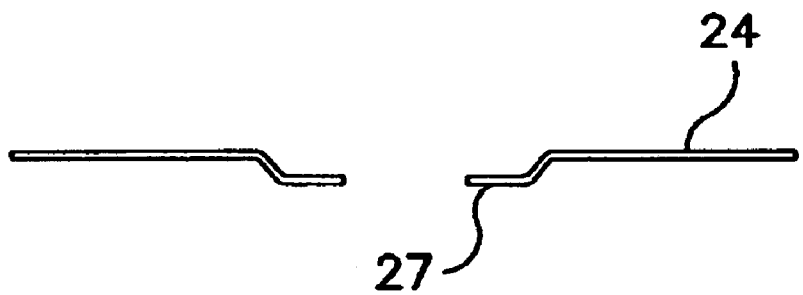
Figure 5A:
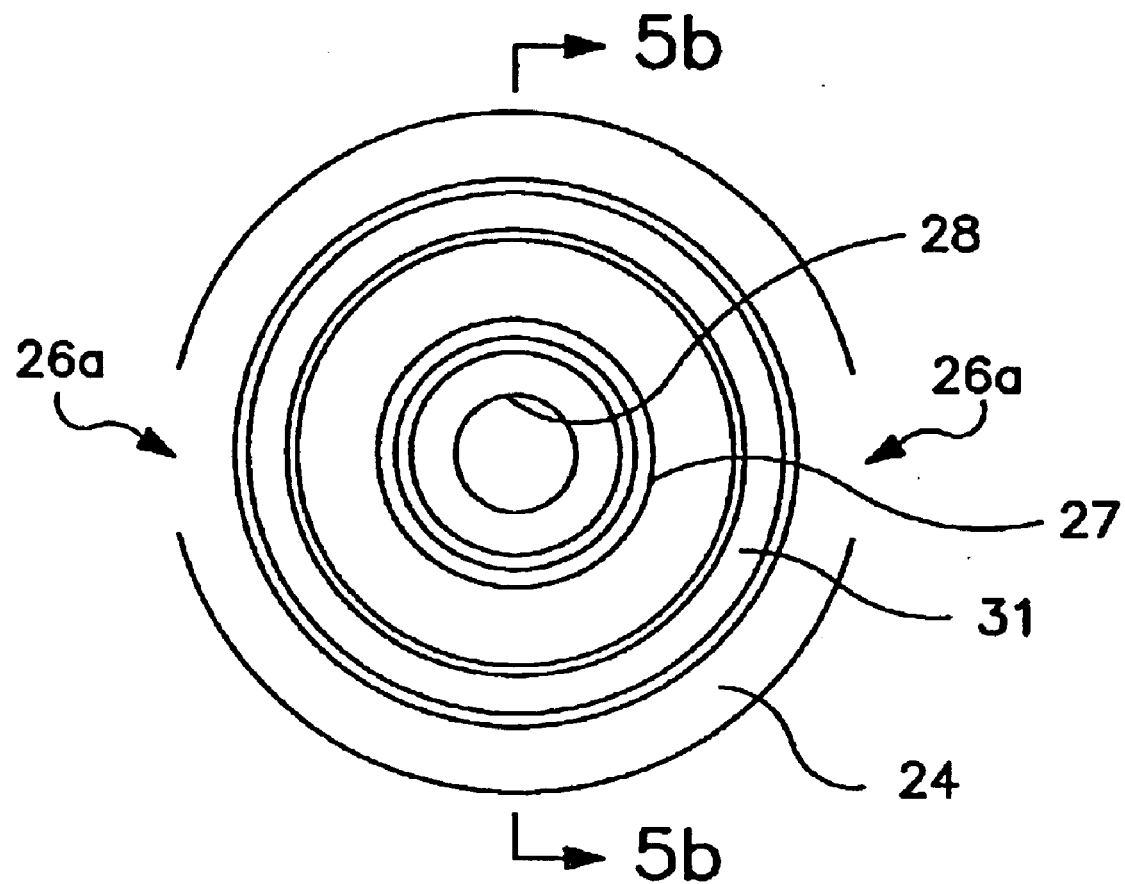
FIG. 5a is a top plan view of a third stage of a part formed in a strip in accordance with one embodiment of the present invention.
Figure 5B:
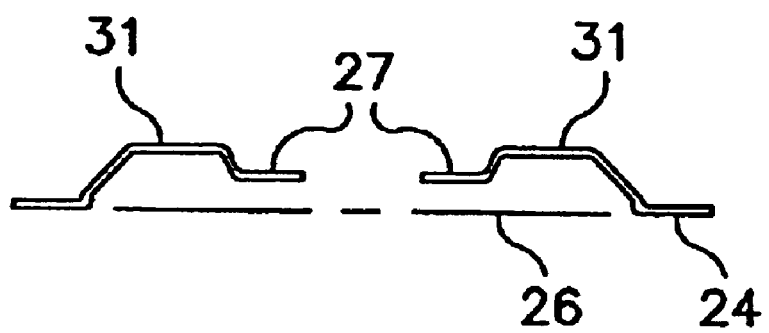

In the case of the rotary shaver head, the next die station in press 30 makes partial lance cuts 25a to substantially form flat blank 24 while uncut sections 26a retain blank 24 in strip 22 (FIGS. 1, 3a and 3b). Additional lance cuts 25b with uncut sections 26b rotated 90° from uncut sections 26a are then formed (FIG. 1), so that part blank 24 remains connected to strip 22. In the second operation on part blank 24, a subsequent die station in press 30 draws a central concave depression 27 downward (FIGS. 1, 4a and 4b). Additional lanced cuts 25c again rotated 90° are added outside cuts 25b, leaving uncut sections 26c. The partially mechanically formed part 24 begins to shrink in diameter but still remains connected to strip 22 by a connecting web formed by lanced cuts 25a, 25b, 25c and uncut sections 26a, 26b, 26c. This connecting web remains to connect the partially formed part to strip 22 throughout the processing until the final die station in the second press, as discussed further below. In the next die station in press 30, a second draw upward creates what will be the top outer form 31 of rotary shaver part 24 (FIGS. 1, 5a and 5b). It is to be understood that the part forming operations described above are progressive and sequential.

Figure 6A:
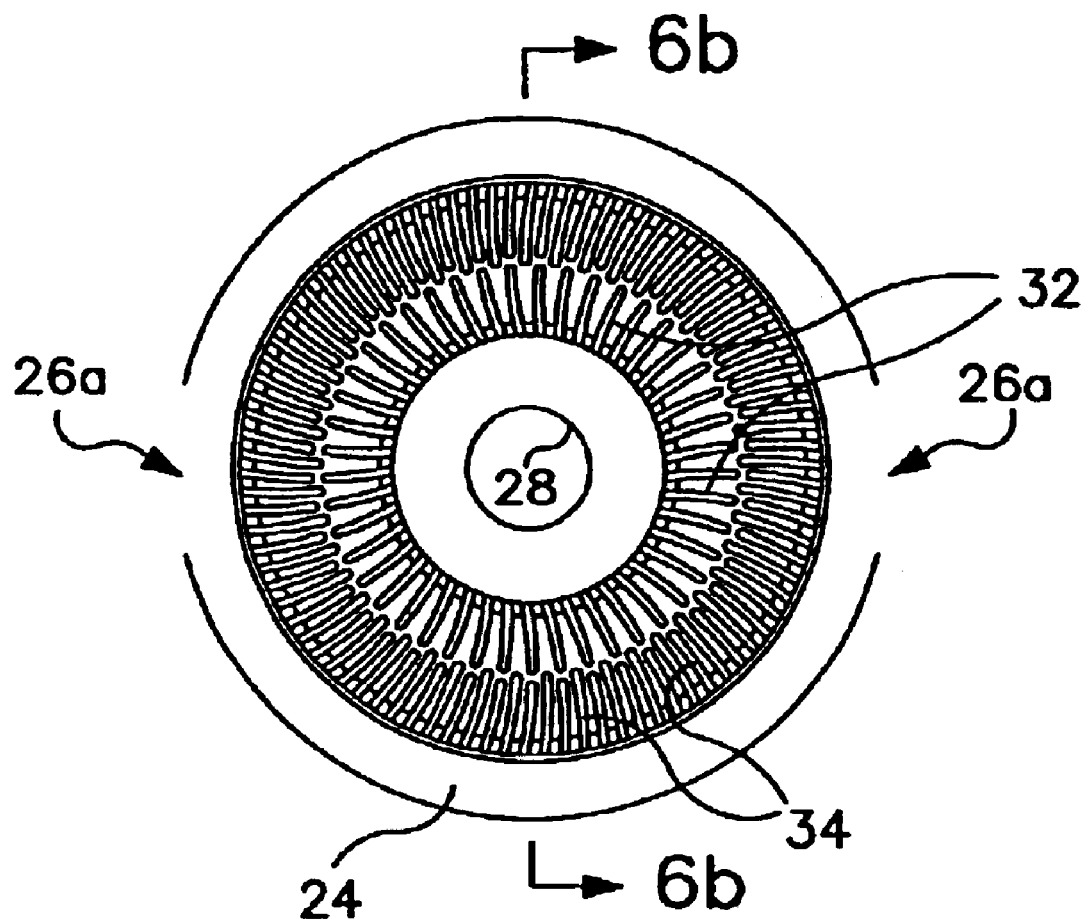
FIG. 6a is a top plan view of a fourth stage of a part formed in a strip in accordance with one embodiment of the present invention.
Figure 6B:

The continuous strip of partially formed parts then leaves the first press, travels through a delay loop in accumulator 35a and then enters a second feeder 23b before entering a multi-head laser machining station 40. The laser is capable of creating a burr free through hole and with precise geometry and tight slot width by controlling the width of the laser beam. The laser obtains its orientation to the cup from registration holes 27 in the strip to which the cup is attached. The laser machining station may have as many laser beam emitting heads as needed coupled in series to create repetitive cutting depending on the number of cups in the strip progression. As the series of parts 24 and strip 22 is fed into laser station 40, a laser beam performs the desired machining operation. In the case of the rotary shaver head, the laser cuts a series of slots in thinned section 29 to create a series of slots 32, 34 (FIGS. 6a, 6b). Slots 32 extend radially outward in a somewhat curved fashion along an inner annular portion of part 24 while slots 34 also extend outward in a similarly curved fashion, in the same direction as slots 32, in an outer annular portion of part 24. These slots 32, 34 permit the hairs on the user's skin to pass through the shaver cup and be cut by a cutting blade mounted within the cup. The remaining metal portions between these slots create the stationary counterblades against which the rotary cutting blade pinches and trims the hairs. This slotted portion of the shaver head is also called the comb portion.

The curved, non-linear slots which create the curved comb portion permits improved cutting geometry of the shaver head. The clockwise circular pattern of comb slots enhances whisker entry into the cut zone and permits tall or standing curled whisker hairs into the screen cup. The actual slot width is not dictated by any particular cutting saw parameters as in the prior art, but simply by the width and thermal column of the laser beam, thereby creating any size comb slot needed for any beard condition.

After exiting the laser station, the strip and partially laser machined formed parts enters a second delay loop accumulator 35b and feeder 23c prior to entering the second press 50 (FIG. 9). Both the first and second delay loops 35a, 35b and feeders 23a, 23b, 23c are useful to correct small irregularities in feed timing to ensure continuous function of presses 30 and 50 and laser station 40. Computer 60 is connected to and controls all of the machining stations 30, 40, 50, accumulators 35a, 35b and feeders 23a, 23b, 23c, and any other mechanical systems used in processing the present invention. Strip parts 24, which are still connected by webs created by partial lanced cuts 25a, 25b and uncut edges 26a, 26b to strip 22, are then fed in a controlled manner into second mechanical press 50 for finished forming. In the case of the rotary shaver head, this finish forming comprises one or more die stations in press 50 which continues the drawing of the part 24 to a deeper draw, without interfering or reforming the portions of the cup which have been laser machined. The series of draw stations establishes the final elevation and outer diameter of the cup.

During these draw stations the die system first engages the existing laser machined comb portion below the demarcation area of the first draw. By capturing the first draw comb portion before the second draw station is engaged, the comb portion of the cup is securely isolated from any distortion. A double bend 33 is created at the periphery of part 24 to create additional hoop strength or stiffening to the part (FIGS. 2, 7a and 7b). The cup is then drawn to its final elevation and is carried to a pinch trim station where it is blanked through the die and severed from the strip becoming a separate piece 36 (FIGS. 2, 8a and 8b). The remaining strip 22, minus the formed parts, continues to a scrap chopper which creates the scrap strip 38 which is ejected from the press and then removed for proper disposal.

The finished formed rotary shaver cup 36 may then be further processed as desired. Although prior to the first draw stations in press 30 the portion of the part which forms the actual comb face was described as being cold formed or hammered to reduce its thickness by 50% or more, alternatively a lapping operation may be performed to reduce the thickness of the cut comb section of the shaver. For example, rotary lapping of the cup face may decrease the thickness of the strip from an initial thickness of 0.008 inches to a final thickness of 0.0032–0.0046 inches. Once the comb portion of the separated part is at the desired thickness, part 36 may then be pressure washed and a nickel plating applied, for example, with a thickness of 0.006 inches.

Figure 10:
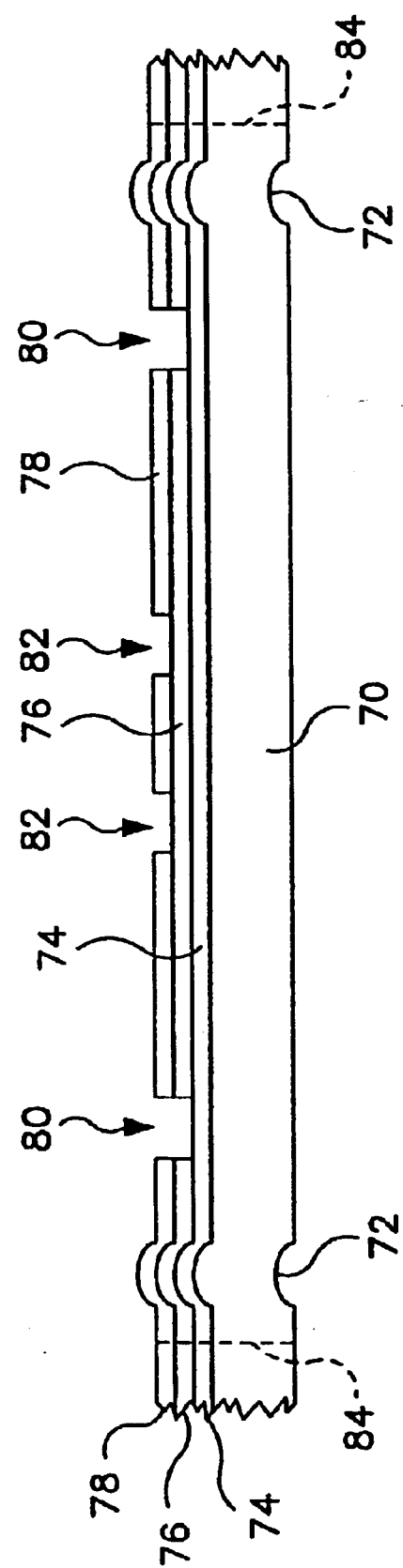
FIG. 10 is a side view of an embodiment of the present invention employing laser etching.

In processing other parts, instead of through cutting by the laser machining process, the process of the present invention may utilize an engraving laser machining process to mark additional features on the product. This laser engraving may be used with or without other laser machining for other parts for example identification plates. This may be accomplished as shown in FIG. 10 by starting with a strip 70, such as aluminum or steel, which may be supplied in coil form and continuously coated with a plurality of different color paints or coatings, such as three sequential layers 74, 76, 78. A first press includes one or more dies for piercing holes and forming a border bead 72 in the coated strip 70. The strip then enters the laser station where a laser beam etches or burns through the coating layers to different depths to expose different color layers, for example, two layer etching 80 to expose color layer 74 or single layer etching 82 to expose different color layer 76. In this manner desired characters or symbols of colors 74 and 76 are created on color background 78. By employing laser etching speeds of up to 1000 in./min. or more and variable laser beam widths created by multiple laser heads, the laser machining station will be able to keep up with the high speed mechanical forming operations. A subsequent press would then cut the finished part from the strip along edge 84.

A further embodiment for laser machining strip, in continuous coil form or in discrete sheets or pieces, is depicted in FIGS. 11–16.

Figure 11:
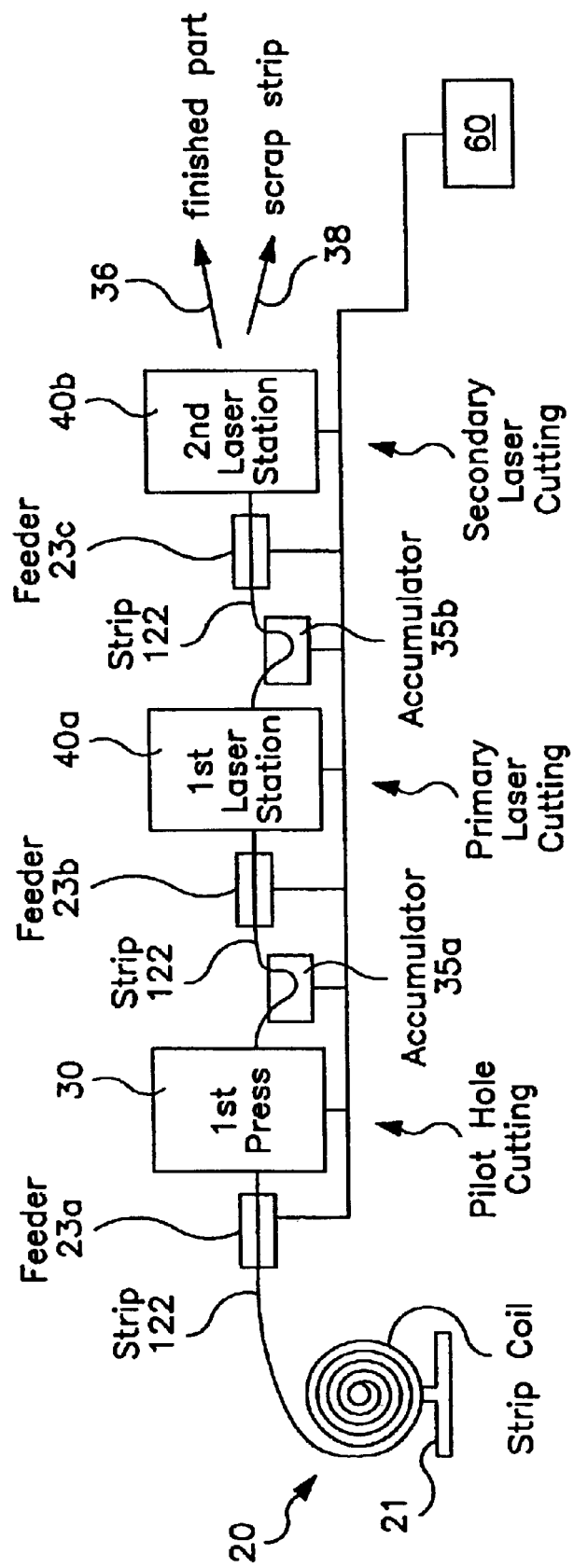
FIG. 11 is a side view, partially in schematic, of another preferred process in accordance with the embodiment of the present invention.

In a schematic view depicted in FIG. 11, which is similar to that shown in FIG. 9, the first machining station 30 comprises a pilot hole cutting station, preferably utilizing a press to mechanically form the pilot hole. First laser station 40a preferably is the primary laser cutting station, and there is further provided a second laser cutting station 40b. In each laser station there are provided one, two or more laser heads containing lasers to cut or otherwise machine strip 122 as it travels downstream of the first press 30. Feeder stations 23b, 23c are associated with laser stations 40a, 40b, respectively. The remaining apparatus is as described in connection with FIG. 9.

Figure 12:
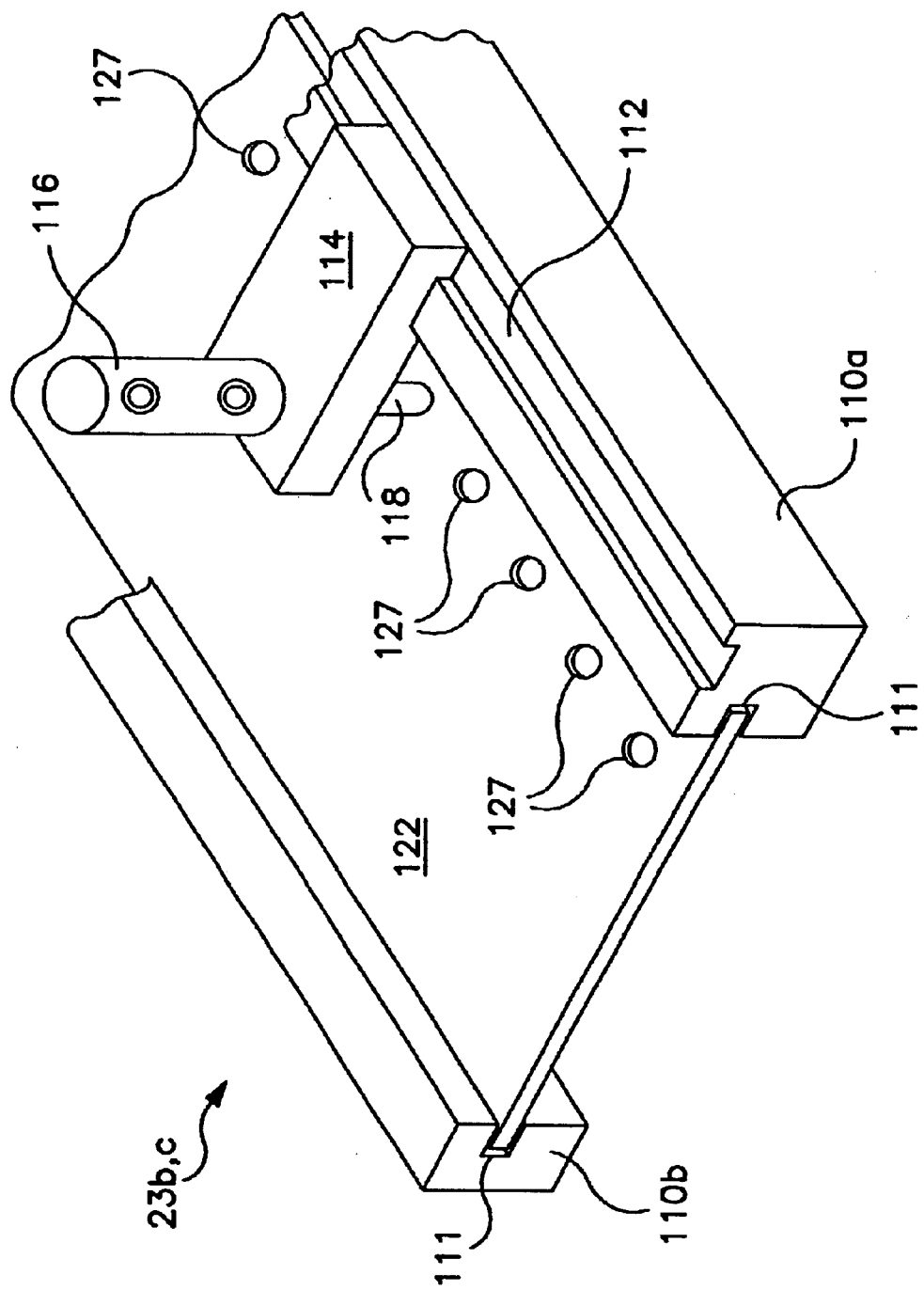
FIG. 12 is a perspective view of a feeder station shown in FIGS. 9 and 11.

As depicted in FIG. 12, feeder stations 23b, 23c preferably include a pair of guide rails 110a, 110b which each have a guide slot or notch 111 which receives the edges of strip 122. Pilot holes 127 have been previously formed in strip 122, preferably in first press 30 by the process previously described. A pilot air cylinder body 116 with air inlets and outlets for connection to a source of pressurized air is mounted on a pilot guide block 114, which extends outward over the strip in the y-direction and is slidable longitudinally in the x-direction of the strip in guide track 112 at the top of guide rail 110a. Extending from below pilot cylinder 116 is pilot pin 118 which moves upward and downward in the z-direction and is configured to be received within strip pilot holes 127 in sequential fashion. Initially, the strip will typically be manually threaded into and through guide slots 111 and into feeder assembly 23b or 23c. A signal is then sent to the microprocessor-based controller (PC) and the pilot pin is retracted in an up position into the cylinder and disengaged out of the strip holes, which is then signaled to the PC. The servo-controlled feeder feeds the strip a specified length equal to a multiple of the pilot hole 127 distance or pitch and sends a signal to the PC, whereupon pilot pin 118 is brought down and engaged within a particular pilot hole 127. The tip of pilot pin 118 is tapered so that if there is a minor mis-registration between the pin and the pilot hole, the entry of the tapered segment within the pilot hole will cause the strip to shift to the correct position. Once the pilot pin is moved down within the pilot hole, the strip is locked and a signal is sent to the PC, which then initiates the laser machining. The position of the pilot pin within the cylinder body is determined by a magnetic sensor read switch, which generates the respective engaged and disengaged position signals. At the end of the particular laser machining step, the pilot pin moves upward, the signal is sent to the PC and the servo feeds the strip a specific feed length, whereupon the process begins again.

Figure 13:
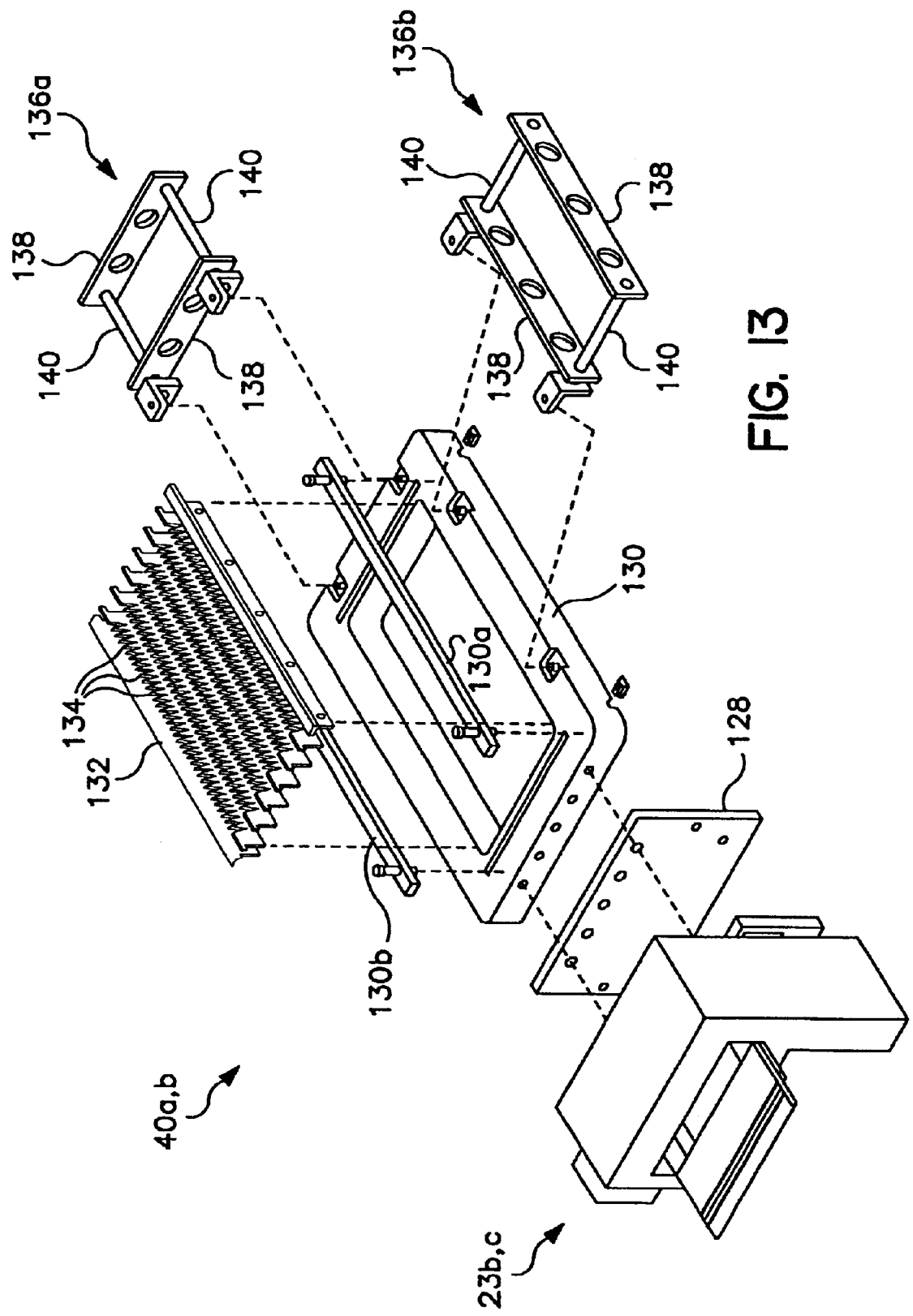
FIG. 13 is an exploded perspective view of the laser stations in FIGS. 9 and 11.
Figure 14:
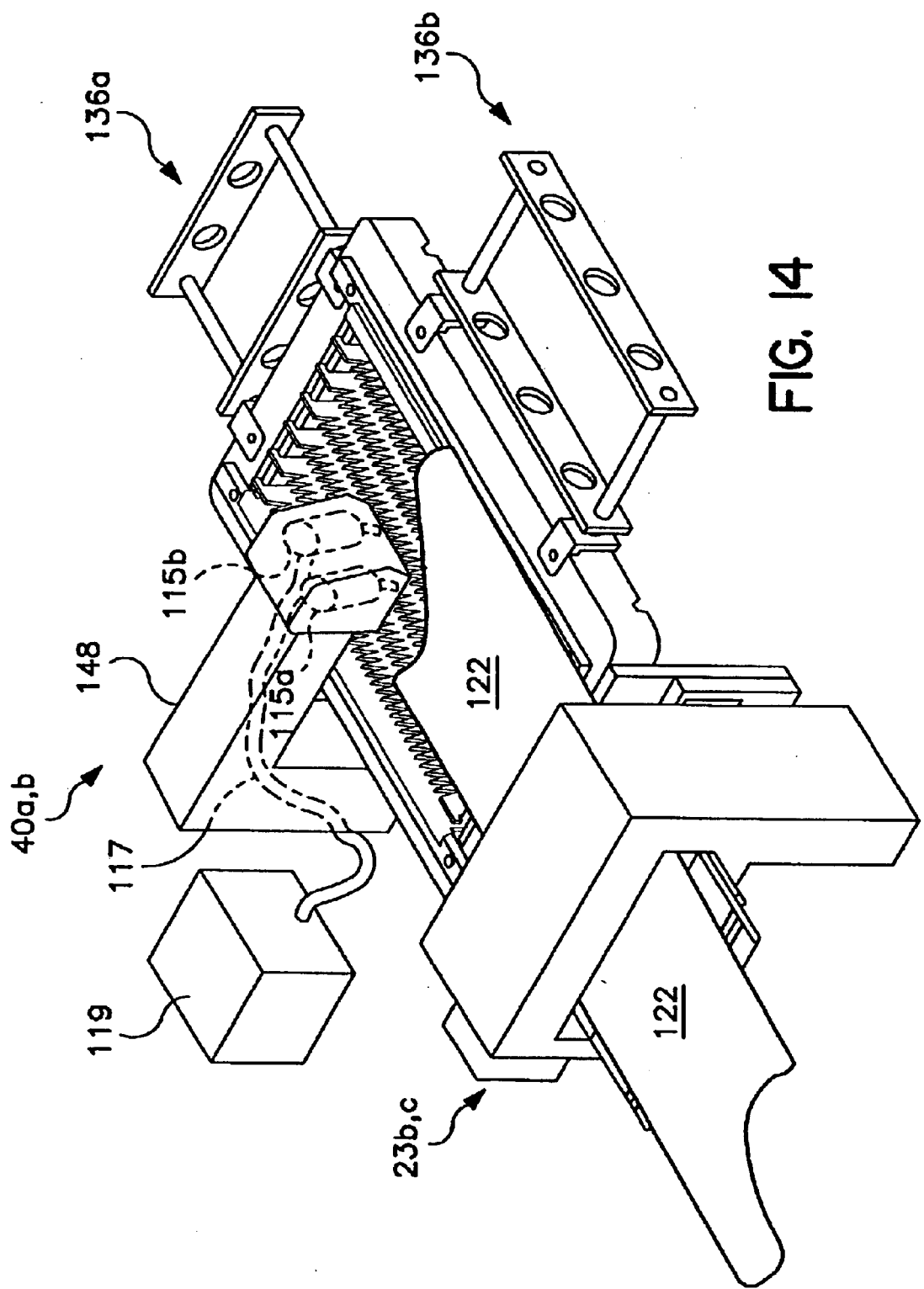
FIG. 14 is a perspective view of a strip being laser machined in the first laser station of FIG. 11.

Laser machining stations 40a, 40b, are depicted in exploded view in FIG. 13 and receiving the strip 122 in FIG. 14. The feeder stations 23b, 23c may be connected to the respective laser machining stations 48a, 40b by mounting plate 128. Each laser machining station includes an open rectangular frame 130 which receives a work platform 132 which is made up of a plurality of pointed supporting teeth 134 which support the sheet at individual, mutually spaced points. This permits through-laser cutting with a minimum of disruption to the work platform. Of course, at some point the work platform will become excessively damaged by such through-laser machining and will have to be replaced. This is easily done by removing securing brackets 130a, 130b which secure the work platform 132 to the frame 130. In the case of laser machining thin strip, tandem servos, e.g. two feeders, may maintain tension on either side of the laser machining station during the laser machining process.

In order to support the sheet of material in a longitudinal direction, there is provided an outrigger holding arm assembly 136a which comprises members 138 extending in the y-direction connected by members 140 extending in the x-direction and secured by brackets to frame 130. This extends the effective support length of frame 130. If individual, discontinuous sheets of width wider than the feeder are cut using the laser-machining station 40a, 40b, a further side outrigger assembly 136b may be employed utilizing members 138 extending in the x-direction connected by members 140 extending in the y-direction and connected by brackets to frame 130. A pair of laser heads 115a, 115b (FIG. 14) are suspended over the laser machining frame 130 and strip by supporting arm 148, which also connects to frame 130. A yttrium/aluminum/garnet (YAG) or other suitable laser is contained in laser power supply 151, and delivers the laser light through fiber optic cable 117 to laser heads 115a, b. A microprocessor based x-y controller, which may be contained in computer 60 (FIG. 11), controls and directs movement of the laser heads and arm over strip 122 in the desired pattern to laser machine the parts.

Figure 15:
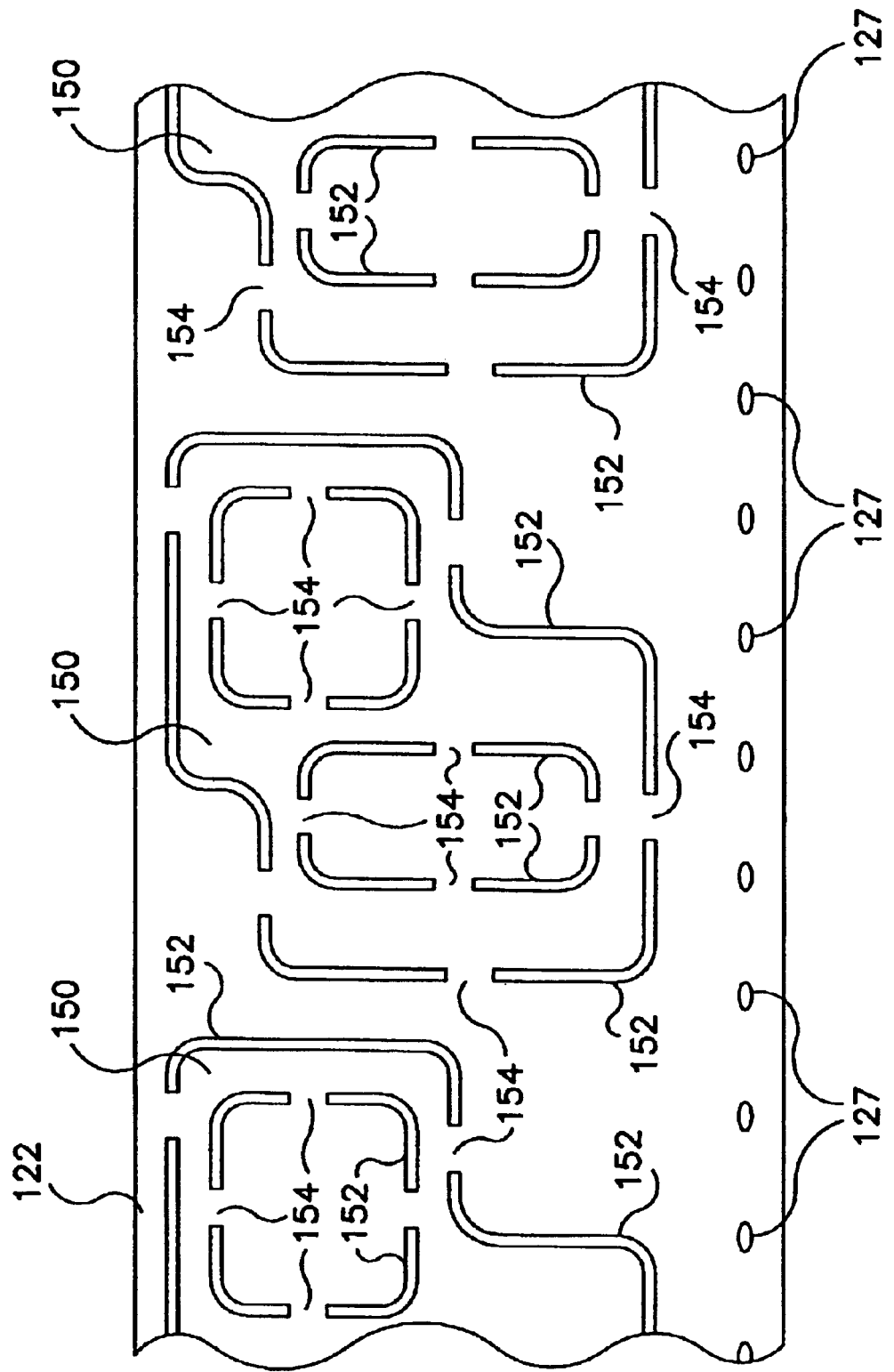
FIG. 15 is a top plan view of a partial laser machined part retained in the strip after the first laser station of FIG. 11.
Figure 16:
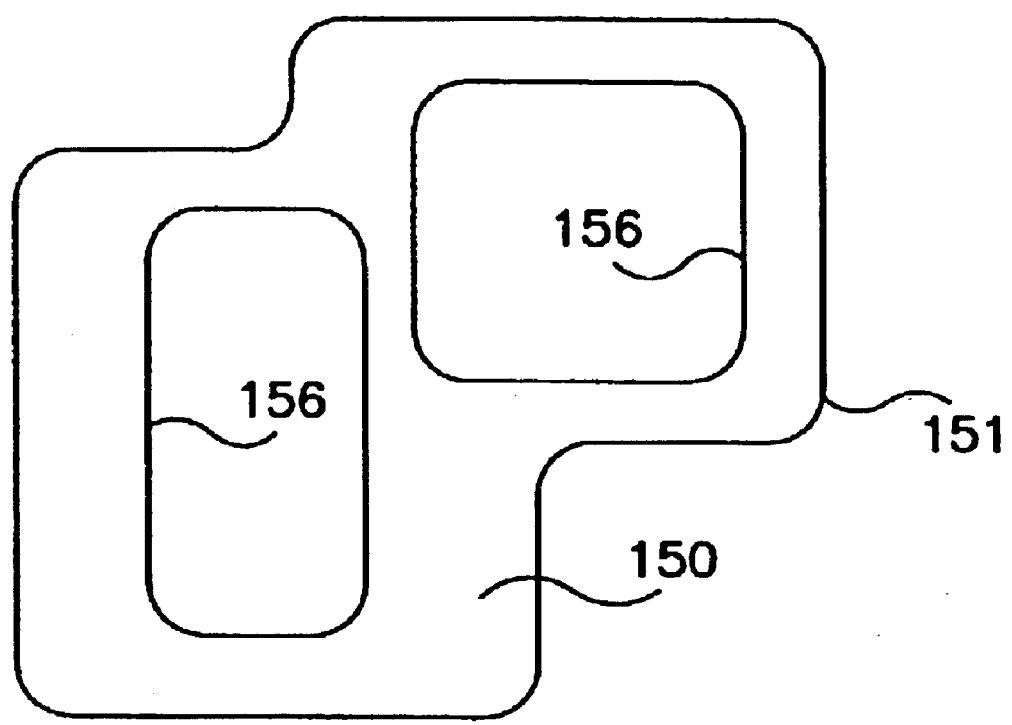
FIG. 16 is a top plan view of the final laser machined part as separated from the strip after the second laser station of FIG. 11.

As shown in FIG. 14 and FIG. 15, a first laser station may make a partial laser machining of a part 150 which extensively cuts or otherwise laser machines the part, but still permits the part to be retained within and held by the remainder of strip 122. In particular, finished laser cuts 152 extend around the inner and outer peripheries of the part 150 except at tab sections 154 which remain uncut and provide the connection to and support by the remainder of strip 122. In a second laser machining station 140b, the laser machining may be completed by cutting tabs 154 along the outer and inner periphery of part 150, resulting in a final part configuration (FIG. 16) which is separated from the remainder of strip 122 and consists entirely of laser-cut openings and edges. Alternatively, some openings or edges on the part may be press formed or cut by first press 30. A conventional knock out arm (not shown) may assist in dropping or otherwise separating part 150 from the remainder of strip 122. The remainder of strip 122 may be then discarded to scrap while the finished parts 150 are stored (FIG. 11).

Instead of using separate laser machining stations as shown in FIG. 11, the present invention may employ a single laser machining station having one, two or more laser heads for laser machining the strip. In the case of only one laser head, the strip into the laser station and the laser is brought into a first position with respect to the strip. In the first position, the laser machines substantially all of the outline of the parts in sequence along the strip, leaving at least one tab portion connecting each part to the strip. The laser is then brought into a different, second position, downstream or further along the strip, where it laser machines the tab portions connecting the parts to the strip in sequence along the strip, thereby separating the laser machined parts from remaining portions of the strip.

Where two or more lasers are used in the same laser station, the lasers may move simultaneously in the same direction with respect to the strip, but each over different portions of the strip, during the laser machining. For example, a first laser will laser machine fresh strip to create substantially all of the outline of the parts, leaving at least one tab portion connecting each part to the strip, while a second laser will laser machine the tab portions connecting the parts to the strip to separate the parts from the strip. The same x-y controller directs and control both lasers. At the conclusion of the machining operation by each laser, the strip feeder advances the strip so that the partial laser machining created by the first laser (FIG. 15) is below the second laser, and fresh strip is below the first laser. The cycle is then repeated.

The present invention may be integrated with existing manufacturing systems which utilize one or more die stations to mechanically form a part, before, after, or both before and after, the laser machining stage. Alternatively, the present invention utilizes one or more successive laser stations to machine a desired part from the strip, preferably after mechanically forming pilot holes in the strip. The process is achieved in continuous strip format resulting in progressive part manufacturing that has considerable advantages over individual part handling used prior for laser machining parts.

While the present invention has been particularly described, in conjunction with a specific preferred Thus, having described the invention, what is claimed is:

1. An apparatus for making parts from strip metal comprising:
   an uncoiler adapted to uncoil a strip of metal from which parts are to be made;
   a first press adapted to form sequential pilot holes in a portion of the metal strip;
   a first laser adapted to laser machine substantially all of an outline of a plurality of parts in sequence along the strip, leaving at least one tab portion connecting each part to the strip; and
   a second laser, following the first laser, adapted to laser machine the tab portions connecting the parts to the strip in sequence along the strip, thereby causing the laser machined parts to separate from remaining portions of the strip.

2. The apparatus of claim 1 further including metal strip accumulators between the first press and the first and second lasers adapted to control process speed differences between the first press and the first and second laser machining stations.

3. The apparatus of claim 1 wherein the first laser and the second laser are adapted to move simultaneously in the same direction with respect to the strip during laser machining.

4. The apparatus of claim 1 wherein the first laser and the second laser are disposed in separate laser stations.

5. The apparatus of claim 1 wherein the first laser and the second laser are both disposed in a single laser station.

6. The apparatus of claim 1 wherein the first laser and the second laser are disposed in one or more laser stations, and further including a laser power supply and a fiber optic cable for transmitting laser light from the laser power supply to the first and second lasers.

7. An apparatus for making parts from strip metal comprising:
   a laser machining station having at least one laser head to laser machine a plurality of parts in sequence along a strip; and
   a servo-controlled feeder connected to the laser machining station to receive and feed the strip in a desired position relative to the at least one laser head, the servo-controlled feeder including a pilot pin that is adapted to engage a hole in the strip to position the strip in a desired position during laser machining, and to disengage from the strip hole during strip feeding.

8. The apparatus of claim 7 further including a laser power supply and a fiber optic cable for transmitting laser light from the laser power supply to the at least one laser head.

* * * * *